United States Patent
Kato

(10) Patent No.: US 8,122,296 B2
(45) Date of Patent: Feb. 21, 2012

(54) INFORMATION PROCESSING APPARATUS AND JOB PROCESSING METHOD

(75) Inventor: Kazunori Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 12/396,274

(22) Filed: Mar. 2, 2009

(65) Prior Publication Data

US 2009/0222403 A1    Sep. 3, 2009

(30) Foreign Application Priority Data

Mar. 3, 2008  (JP) ................. 2008-051838

(51) Int. Cl.
*G06F 11/00* (2006.01)
(52) U.S. Cl. ................ 714/44; 399/10; 714/45
(58) Field of Classification Search .................. None
See application file for complete search history.

(56) References Cited

U.S. PATENT DOCUMENTS

| 7,340,501 B2 | 3/2008 | Miida et al. | |
| 2002/0178209 A1* | 11/2002 | Boettcher | 709/105 |
| 2003/0204590 A1* | 10/2003 | Torii | 709/224 |
| 2006/0075300 A1* | 4/2006 | Mukherjee | 714/38 |

FOREIGN PATENT DOCUMENTS

| JP | 2002-132912 A | 5/2002 |
| JP | 2002-140297 A | 5/2002 |

* cited by examiner

*Primary Examiner* — Scott Baderman
*Assistant Examiner* — Jason Bryan
(74) *Attorney, Agent, or Firm* — Canon USA, Inc., I.P Division

(57) ABSTRACT

When an image processing apparatus acquires job log information and error log information from an image forming apparatus, the information processing apparatus identifies a job processing time from a job start time and a job end time of each job which are recorded in the acquired job log information. Subsequently, the information processing apparatus identifies a job suspension time from an occurrence time and a recovery time of an error of each log which is recorded in the error log information. Then, the information processing apparatus calculates a job execution time based on the identified job processing time and the job suspension time.

7 Claims, 18 Drawing Sheets

| 701 | 702 | 703 | 704 | |
|---|---|---|---|---|
| JOB LOG ID | JOB TYPE | START TIME | END TIME | |
| 1001 | PRINT | 2007/04/30 14:25:30 | 2007/04/30 14:40:30 | 711 |
| 1002 | SCAN | 2007/04/30 14:31:00 | 2007/04/30 14:35:30 | 712 |
| 1003 | COPY | 2007/04/30 14:40:00 | 2007/04/30 14:45:30 | 713 |
| | | | | |

FIG.8

| ERROR LOG ID | ERROR TYPE | OCCURRENCE TIME | RECOVERY TIME | |
|---|---|---|---|---|
| 201 | DISCHARGE PAPER JAM | 2007/04/30 14:30:30 | 2007/04/30 14:34:30 | ~811 |
| 202 | ADF JAM | 2007/04/30 14:32:00 | 2007/04/30 14:35:00 | ~812 |
| | | | | |

| JOB LOG ID | JOB PROCESSING TIME | |
|---|---|---|
| 1001 | 00:11:00 | ~1611 |
| 1002 | 00:01:30 | ~1612 |
| 1003 | 00:05:00 | ~1613 |
|  |  | |

| ERROR TYPE | JOB TYPE | |
|---|---|---|
| DISCHARGE PAPER JAM | Print, Copy, BoxPrint, FaxPrint | ~1211 |
| FEED PAPER JAM | Print, Copy, BoxPrint, FaxPrint | ~1212 |
| ADF JAM | Copy, Scan, Send | ~1213 |
| OUT OF PAPER | Print, Copy, BoxPrint, FaxPrint | ~1214 |
|  |  | |

STORAGE MEDIUM SUCH AS FD/CD-ROM

| DIRECTORY INFORMATION |
|---|
| PROGRAM CODE CORRESPONDING TO STEPS ILLUSTRATED IN FLOWCHART IN FIG. 9 |
| PROGRAM CODE CORRESPONDING TO STEPS ILLUSTRATED IN FLOWCHART IN FIG. 11 |
| PROGRAM CODE CORRESPONDING TO STEPS ILLUSTRATED IN FLOWCHART IN FIG. 12 |
| PROGRAM CODE CORRESPONDING TO STEPS ILLUSTRATED IN FLOWCHART IN FIG. 16 |
| PROGRAM CODE CORRESPONDING TO STEPS ILLUSTRATED IN FLOWCHART IN FIG. 17 |

INFORMATION PROCESSING APPARATUS AND JOB PROCESSING METHOD

BACKGROUND OF THE INVENTION

1. Field of the Invention

The present invention relates to an information processing apparatus configured to calculate an operating time of an image forming apparatus.

2. Description of the Related Art

Generally, an operation rate of an image forming apparatus such as a printer, a copier, or a multifunction peripheral refers to a proportion of a time in which the image forming apparatus actually processes a job, such as printing, to a time in which the image forming apparatus is operated. The operation rate is used for analyzing an operation state of the image forming apparatus. Based on the analysis, a most suitable model is selected and offered to a customer.

Conventionally, in calculating the operation rate of he image forming apparatus, a job processing time of the image forming apparatus is calculated by subtracting a start time from an end time of a job recorded in a job execution history (job log information) of the image forming apparatus. Next, a total processing time of jobs which are processed in a certain period is calculated. Then, the operation rate of the image forming apparatus in the certain period is obtained using the calculation result. The operation rate is used for analyzing the operation state of the image forming apparatus.

Japanese Patent Application Laid-Open No. 2002-132912 discusses a system which acquires a number of sheets processed by an image data processing apparatus in a predetermined period as information that indicates a usage state of the image data processing apparatus to be analyzed. Then, whether a capacity of the image data processing apparatus is appropriate for a usage by a customer is determined according to the capacity of the analyzed image data processing apparatus and the number of sheets processed in the predetermined period. If the image data processing apparatus is determined to be inappropriate, information about a model that is appropriate for the usage by the customer is selected from a database and offered to the user.

Japanese Patent Application Laid-Open No. 2002-140297 discusses an operation rate calculation system in which a node connected to a network is monitored at a predetermined polling interval. In this way, an occurrence time and a recovery time of a malfunction are detected and a down time of the node can be calculated.

In an operation rate analysis of an image forming apparatus, a job processing time is calculated by subtracting a start time from an end time of a job which is recorded in job log information. However, according to the above-described method, a suspension time of the job due to an error of the image forming apparatus is not considered in the calculation of the job processing time. For example, if an error such as a paper jam occurs during an execution of a print job, the print job is stopped until the error is removed. The end time of the processing of the print job after the image forming apparatus is recovered is recorded in the job log as the job end time. Thus, the time the operation of the image forming apparatus is stopped due to the error is included in the job processing time.

In analyzing a load of an image forming apparatus from a sum of job processing times, if a suspension time in which the image forming apparatus is not processing a job due to an error is included in the job processing time, the estimated load will be higher than an actual load.

SUMMARY OF THE INVENTION

According to an aspect of the present invention, an image processing apparatus is capable of calculating an operating time of an image forming apparatus.

According to another aspect of the present invention, an information processing apparatus that is configured to calculate an operation rate of an image forming apparatus by using a specified period in which the image forming apparatus is operating and a sum of job execution times of a plurality of jobs executed in the specified period comprises an acquisition unit configured to acquire job log information and error log information from the image forming apparatus, an identification unit configured to identify a job processing time from a job start time and a job end time of each job recorded in the job log information which is acquired by the acquisition unit and identify a job suspension time of each job from an occurrence time and a recovery time of an error of each log recorded in the error log information, and a calculation unit configured to calculate the job execution time based on the job processing time and the job suspension time which are identified by the identification unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a table illustrating job log information managed by a job log management unit illustrated in FIG. 6.

FIG. 8 is a table illustrating error log information managed by an error log management unit illustrated in FIG. 6.

FIG. 13 illustrates a structure of an analysis result table managed by the analytical processing unit illustrated in FIG. 5.

FIG. 15 illustrates an example of an error/job relation table managed by the analytical processing unit included in the analytical server illustrated in FIG. 1.

FIG. 18 is a memory map of a storage medium configured to store various types of data processing programs which can be read by the information processing apparatus according to exemplary embodiments of the present invention.

DETAILED DESCRIPTION OF THE EMBODIMENTS

Various exemplary embodiments, features, and aspects of the invention will be described in detail below with reference to the drawings.

Figure 1:
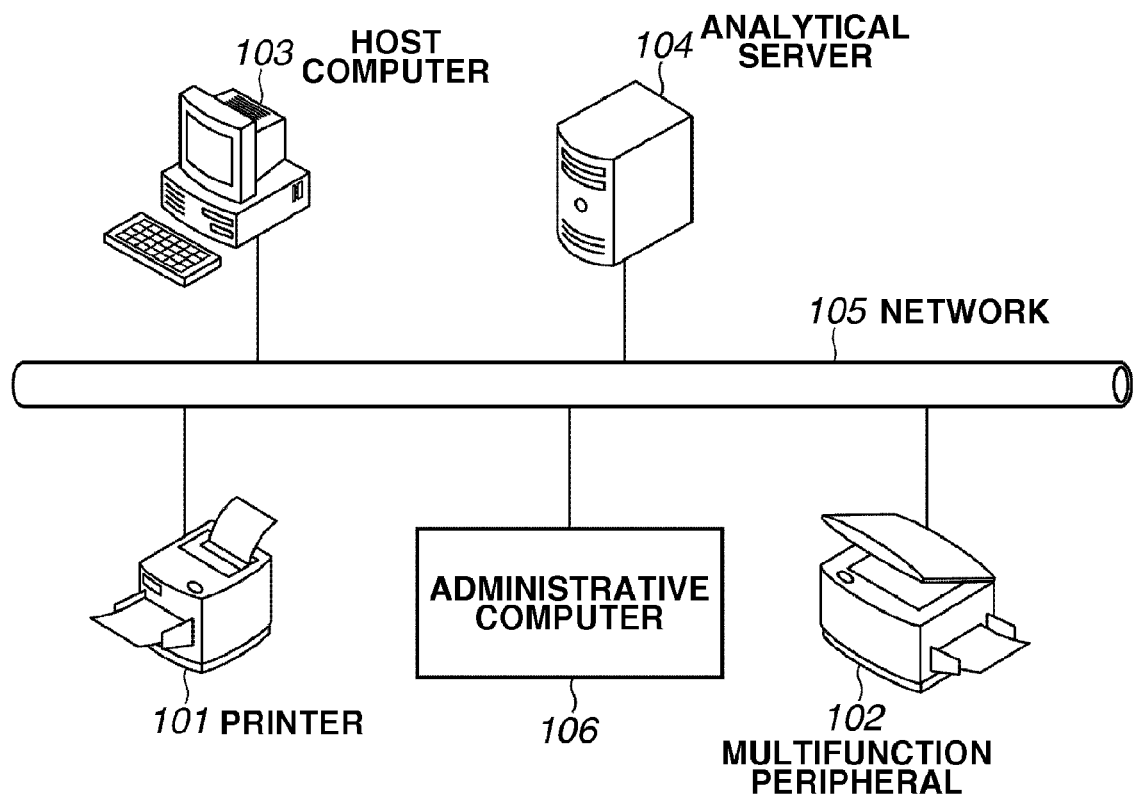
FIG. 1 is a schematic diagram illustrating a configuration of a system for analyzing an operation state of an image forming apparatus according to an exemplary embodiment of the present invention.

FIG. 1 is a schematic diagram illustrating a configuration of a system for analyzing an operation state of an image forming apparatus according to a first exemplary embodiment of the present invention.

In FIG. 1, a host computer 103 is used by a user to create image data and perform printing. The host computer 103 includes a hardware resource and a software resource including an operating system (OS) and a device driver which are described below. Further, the host computer 103 is communicably connected to devices which are connected to a network 105 via a predetermined protocol.

A printer 101 receives print data via the network 105 and performs printing on print paper using a known print technique such as an electrophotographic technique and an ink jet technique. A multifunction peripheral (MFP) 102 receives the print data via the network 105 and performs printing on print paper using a known print technique such as the electrophotographic technique and the ink jet technique. Further, the multifunction peripheral 102 includes functions to scan a paper document via a scanner, perform copying, convert the scanned data into image data, and send the image data via an electronic mail. The present invention is also applicable to a printer that does not have a copy function.

An analytical server 104 performs analysis of an operation state of the printer 101 and the multifunction peripheral 102. The analysis processing includes calculation processing of substantial job processing time using a job processing time and a job suspension time due to, for example, an error which are described below.

The host computer 103, the multifunction peripheral 102, the printer 101, and the analytical server 104 are communicably connected via the network 105 which uses a known technique such as the Ethernet™.

In the present exemplary embodiment, the analytical server 104 is provided separately from the printer 101 and the multifunction peripheral 102, however, a module having a function similar to the analytical server 104 can be included in the printer 101 or the multifunction peripheral 102. In this case, data will be passed via a system bus instead of network communicating between the analytical server 104 and the printer 101 or the multifunction peripheral 102.

Figure 2:
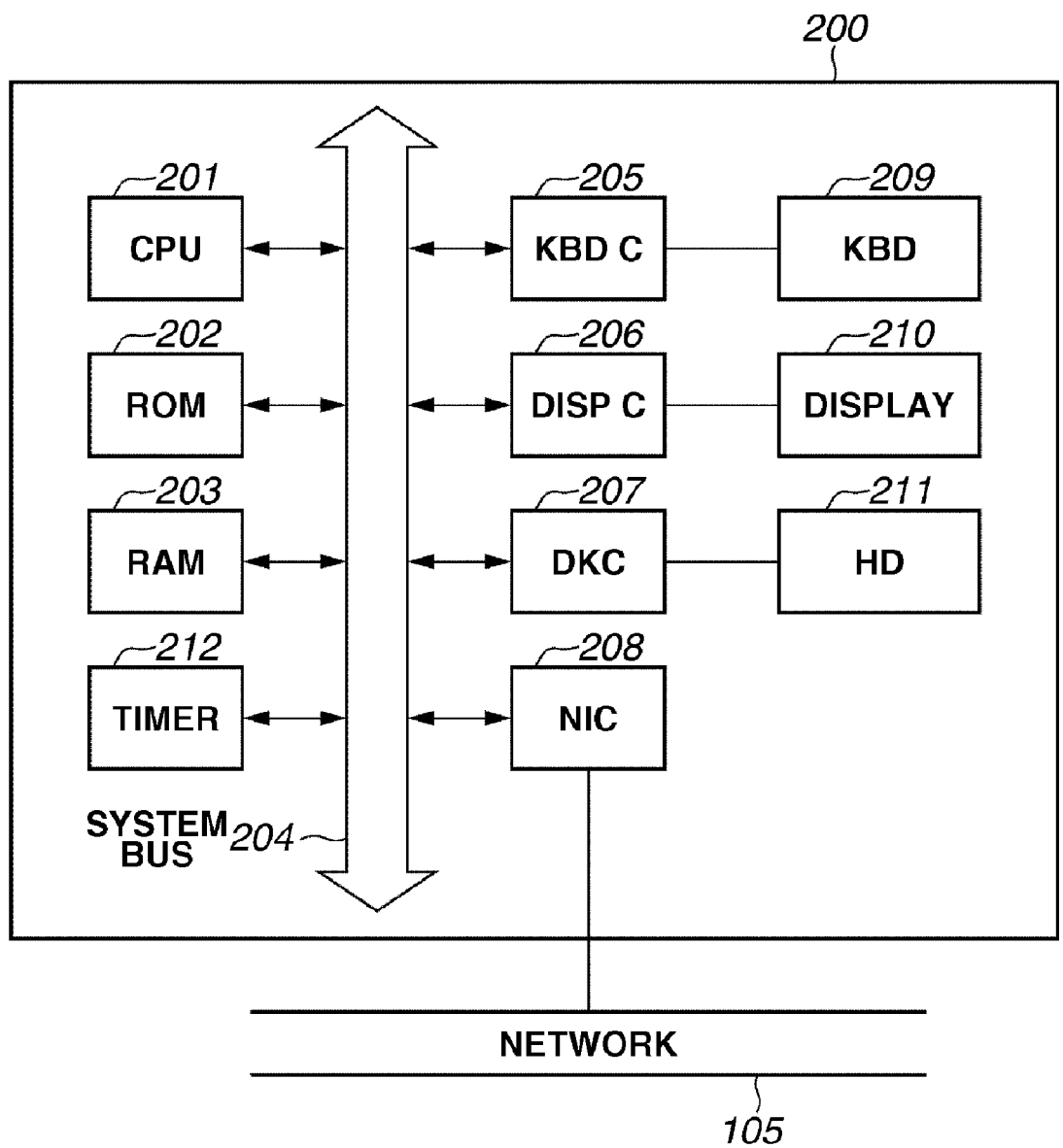
FIG. 2 is a block diagram illustrating an inner configuration of an information processing apparatus which constitutes a host computer and an analytical server.

FIG. 2 is a block diagram illustrating an inner configuration of an information processing apparatus such as the host computer 103 or the analytical server 104.

FIG. 2 illustrates an entire personal computer (PC) 200. The PC 200 includes a central processing unit (CPU) 201 configured to execute software stored in a read-only memory (ROM) 202 or other memories, for example, a hard disk (HD) 211 as a mass storage device. The CPU 201 controls each device connected to a system bus 204 in an overall manner.

A random access memory (RAM) 203 functions as a main memory and a work area of the CPU 201. A keyboard controller (KBDC) 205 controls an instruction which is input from a keyboard (KBD) 209 of the PC. A display controller (DISPC) 206 controls display of a display module (DISPLAY) 210, which is, for example, a liquid crystal display.

A disk controller (DKC) 207 controls the HD 211 as a mass storage device. A network interface card (NIC) 208 exchanges data bidirectionally with another node via the network 105.

Figure 3:
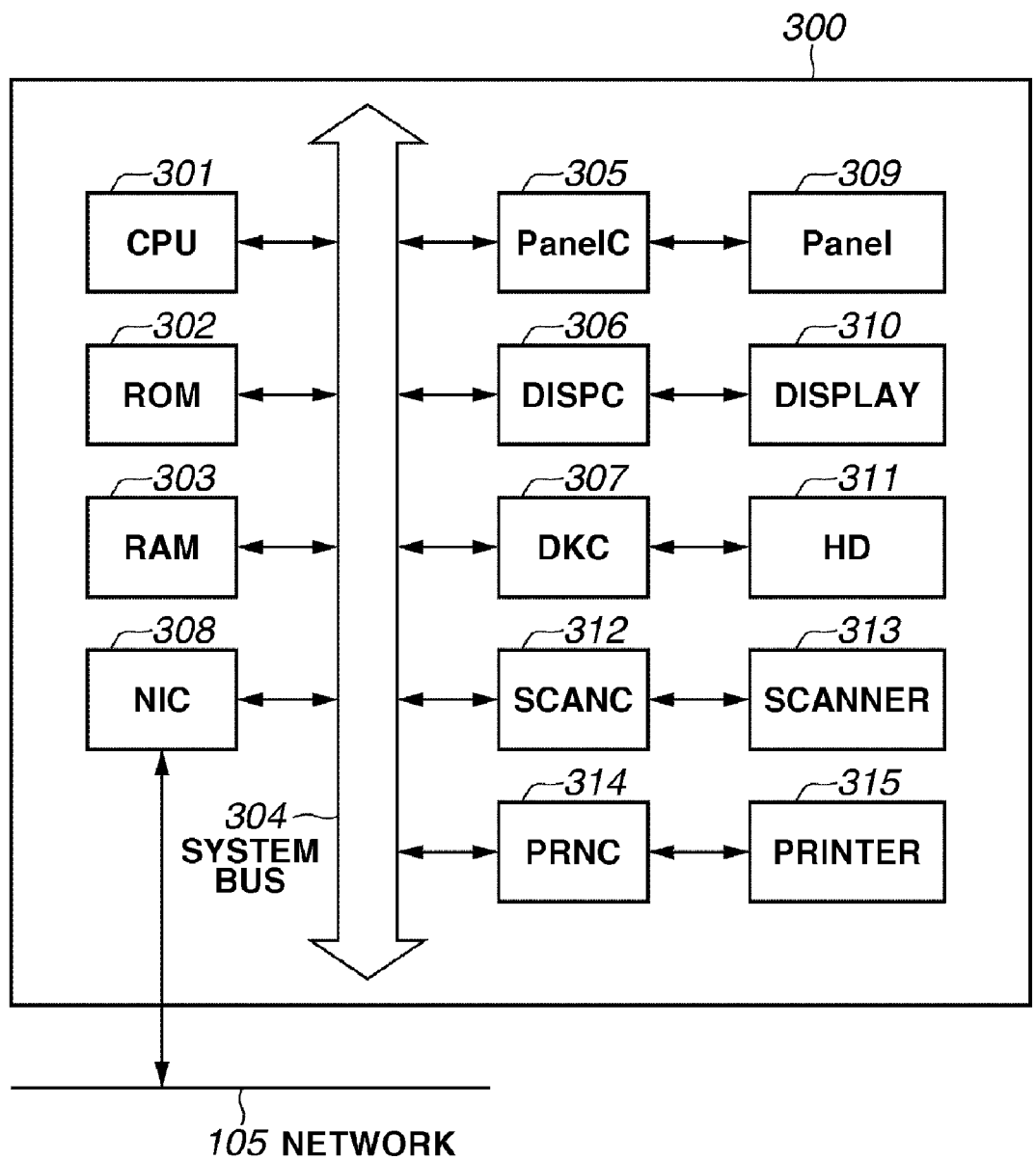
FIG. 3 is a block diagram illustrating an example of an inner configuration of a multifunction peripheral illustrated in FIG. 1.

FIG. 3 is a block diagram illustrating an example of an inner configuration of the multifunction peripheral 102 illustrated in FIG. 1.

In FIG. 3, a multifunction peripheral 300 represents an entire multifunction peripheral. The multifunction peripheral 300 includes a CPU 301 configured to execute software stored in a ROM 302 or other memories, for example, an HD 311 as a mass storage device. The CPU 301 controls each device connected to a system bus 304 in an overall manner. A RAM 303 functions as a main memory and a work area of the CPU 301. A panel controller (PanelC) 305 controls an instruction which is input from an operation panel (Panel) 309 of the multifunction peripheral.

A display controller (DISPC) 306 controls display of a display module (DISPLAY) 310, which is, for example, a liquid crystal display. A disk controller (DKC) 307 controls the HD 311 which is a mass storage device. A network interface card (NIC) 308 exchanges data with another node via the network 105.

A scanner controller (SCANC) 312 controls an optical scanner apparatus (scanner) 313 included in the multifunction peripheral to scan a paper document. A printer controller (PRNC) 314 controls a printer apparatus (printer) 315 of the multifunction peripheral to print on print paper using a known print technique such as the electrophotographic technique and the ink jet technique.

The inner configuration of the printer 101 illustrated in FIG. 1 can be considered to have the above-described inner configuration of the multifunction peripheral 102 excluding the scanner controller 312 and the optical scanner apparatus 313. Further, the inner configuration of the printer 101 can have the inner configuration of the multifunction peripheral 102 excluding the panel controller (PanelC) 305, the operation panel 309, the display controller (DISPC) 306, and the display module (DISPLAY) 310.

Figure 4:
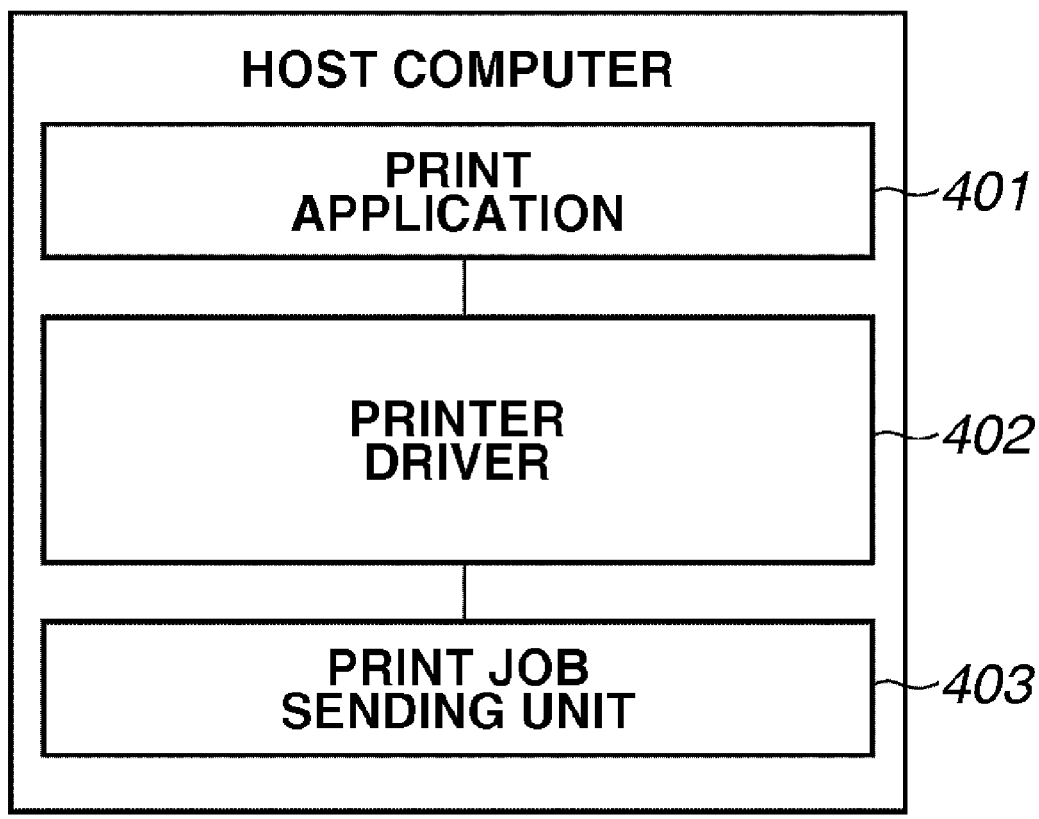
FIG. 4 is a block diagram illustrating a detailed configuration of a module of the host computer illustrated in FIG. 1.

FIG. 4 is a block diagram illustrating a detailed configuration of a module of the host computer 103 illustrated in FIG. 1.

In FIG. 4, a print application 401 issues a print instruction by sending a command such as a rendering command to a printer driver 402. The printer driver 402 converts the rendering command received from the print application 401 into print data or page description language (PDL) that can be interpreted by the multifunction peripheral. Further, the printer driver 402 adds a user ID of a user who instructed printing, as job owner information by using the print application 401, generates a print job, and sends the generated print job to a print job sending unit 403. The print job sending unit 403 sends the print job received from the printer driver 402 to the multifunction peripheral 102.

Figure 5:
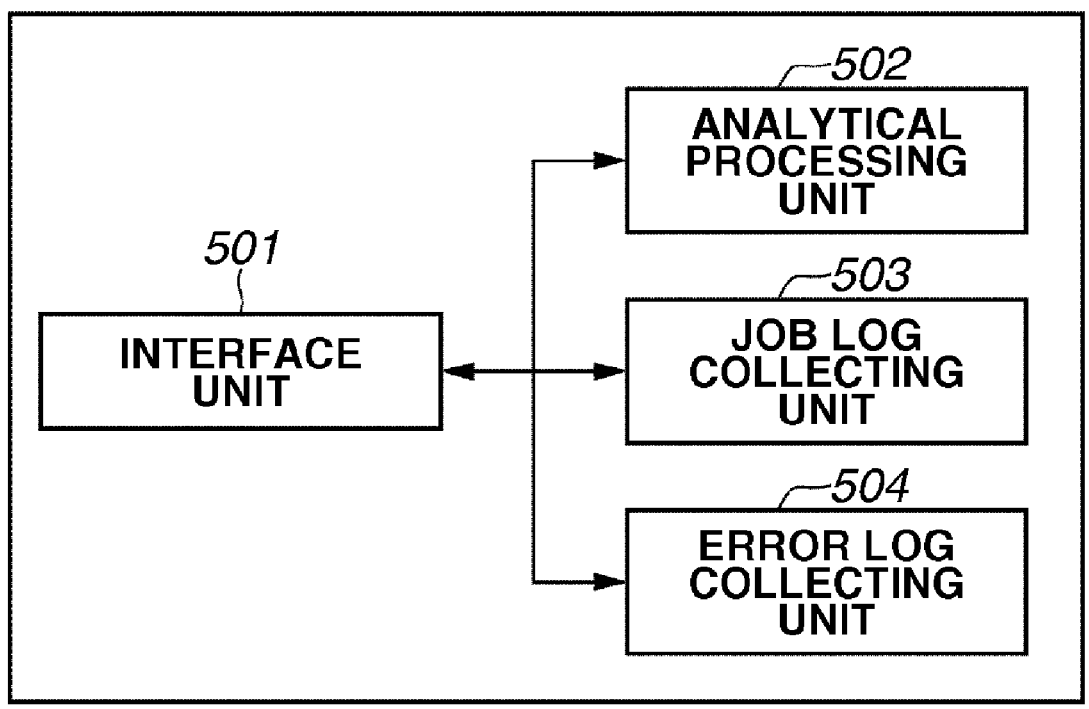
FIG. 5 is a block diagram illustrating a detailed configuration of the analytical server illustrated in FIG. 1.

FIG. 5 is a block diagram illustrating a detailed configuration of the analytical server 104 illustrated in FIG. 1.

FIG. 5 illustrates an entire analytical server 500. An interface unit 501 communicates with the multifunction peripheral 102 using the NIC 208 illustrated in FIG. 2 via the network 105. An analytical processing unit 502 performs analysis of an operation state of the image forming apparatus such as the multifunction peripheral 102 based on job log information and error log information.

A job log collecting unit 503 collects the job log information from the printer 101 and the multifunction peripheral 102 and stores the collected information in a job information area of the HD 211. An error log collecting unit 504 collects the error log information from the printer 101 and the multifunction peripheral 102 and stores the collected information in an error information area of the HD 211.

Figure 6:
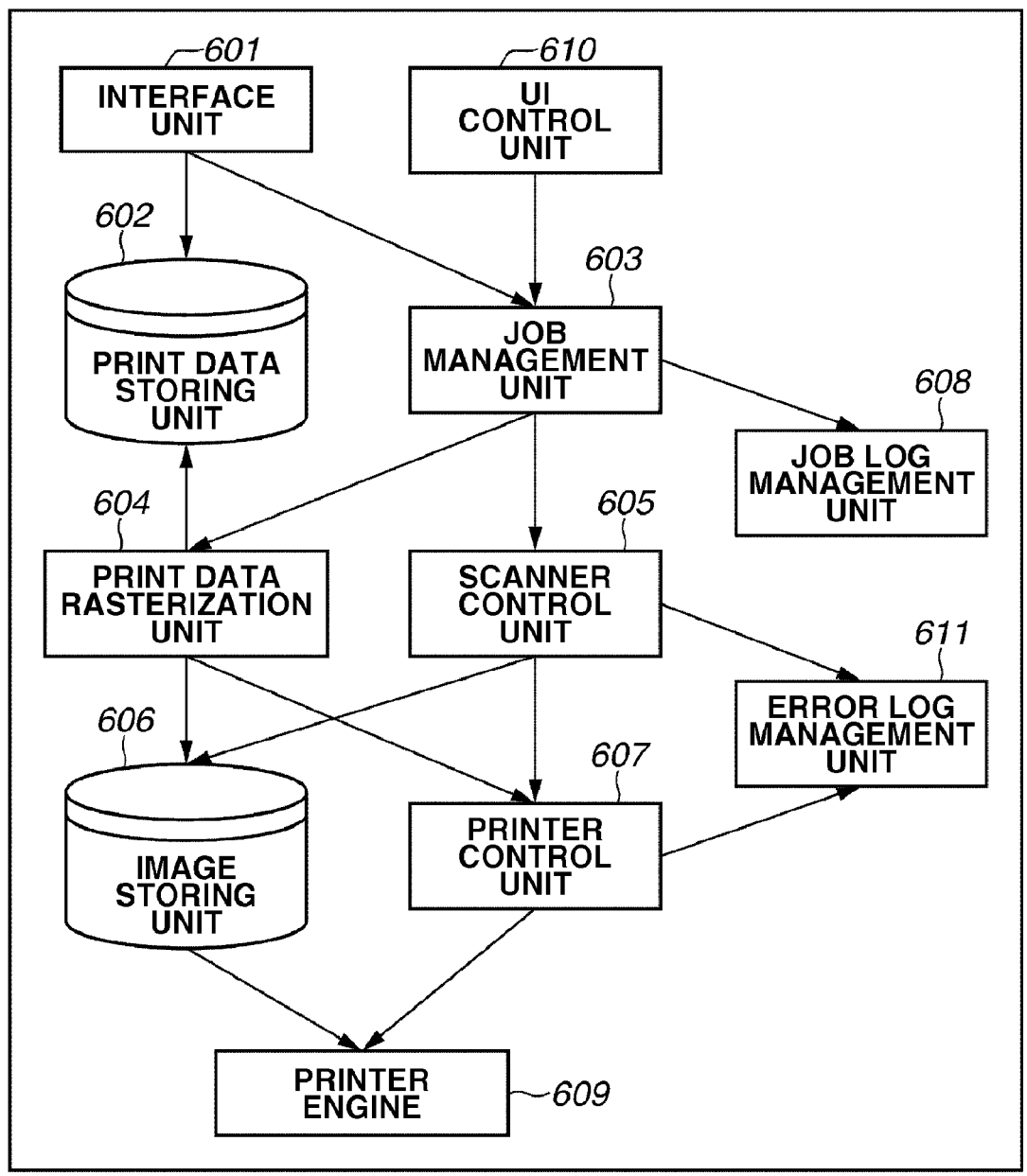
FIG. 6 is a block diagram illustrating a data processing configuration of the multifunction peripheral illustrated in FIG. 1.

FIG. 6 is a block diagram illustrating a data processing configuration of the multifunction peripheral 102 illustrated in FIG. 1.

FIG. 6 illustrates an entire multifunction peripheral 600. An interface unit 601 is connected to the network 105 and receives a print job sent from the host computer 103.

A print data storing unit 602 temporarily stores print job data. A user interface (UI) control unit 610 controls the operation panel 309 via the panel controller (PanelC) 305 and receives a copy instruction and a scan-sending instruction which are input by the user to the multifunction peripheral 102.

A job management unit 603 analyzes the print job received from the host computer 103 to acquire output attribute information such as a number of copies to be printed and whether color printing is to be performed, and manages the output attribute information as job information together with a job start time.

A print data rasterization unit 604 performs image generation processing according to the job information which is managed by the job management unit 603. The print data rasterization unit 604 generates image data in the RAM 203 by acquiring print data from the print data storing unit 602.

A scanner control unit 605 controls the scanner controller 312, scans a paper document, and generates image data. When an auto document feeder (ADF) or a recirculating document feeder (RDF) can be connected to the multifunction peripheral, the scanner control unit 605 controls document feeding and document discharging performed by the ADF or the RDF. Further, the scanner control unit 605 can control reverse operation when a two-sided document is scanned.

An image storing unit 606 temporarily stores the image data generated by the print data rasterization unit 604 and the scanner control unit 605. A printer control unit 607 controls a printer engine 609 to print the image data stored in the image storing unit 606.

The printer engine 609 prints the image data stored in the image storing unit 606 on a medium such as printing paper using a known print technique such as the electrophotographic technique and the ink jet technique.

A job log management unit 608 manages job history information. When a job is completed, the job management unit 603 sends the job information it manages to the job log management unit 608 as job log information. Then, the job log information is stored in the job log management unit 608. The job log management unit 608 sends a job log to the analytical server 104 in response to a request therefrom.

An error log management unit 611 manages error history information. When an error occurs in the scanner or the printer engine, the scanner control unit 605 or the printer control unit 607 sends error log information including an occurrence time, a recovery time, and an error type of the error to the error log management unit 611. Then, the error log information is stored in the error log management unit 611. The error log management unit 611 sends an error log to the analytical server 104 in a response to a request therefrom.

A configuration of the printer 101 that does not have a scanner can be considered to have the configuration of the multifunction peripheral 102 described in FIG. 6 excluding the scanner control unit 605 and the UI control unit 610.

FIG. 7 is a table illustrating the job log information managed by the job log management unit 608 illustrated in FIG. 6. The table illustrates a case where a plurality of jobs are overlappingly processed at the same time since the plurality of jobs having different attributes can be executed at the same time in the multifunction peripheral 102.

In FIG. 7, a job log ID 701 is used for uniquely identifying a job log in the system.

A job type 702 represents a type of a job such as print, copy, or scan instructed by the host computer 103 according to the present exemplary embodiment. A job start time 703 indicates when a job started. A job end time 704 indicates when the job ended. According to the information managed by the job log management unit 608, log information indicating which type of the job is executed and when the job started and ended can be recorded.

For example, a job log 711 is a job log of a print job that started on 2007/04/30 at 14:25:30 and ended on 2007/04/30 at 14:40:30. A job log 712 is a job log of a scan job that started on 2007/04/30 at 14:31:00 and ended on 2007/04/30 at 14:35:30. A job log 713 is a job log of a copy job that started on 2007/04/30 at 14:40:00 and ended on 2007/04/30 at 14:45:30.

The job log information table can be generated for each job type.

FIG. 8 is a table illustrating the error log information managed by the error log management unit 611 illustrated in FIG. 6.

In FIG. 8, an error log ID 801 is used for uniquely identifying an error log in the system. An error type 802 represents a type of error such as discharge paper jam, feed paper jam, ADF paper jam, and out-of-paper according to the present exemplary embodiment.

An occurrence time 803 indicates when an error occurred. A recovery time 804 indicates when the error is recovered. For example, an error log 811 is an error log of a discharge paper jam error that occurred on 2007/04/30 at 14:30:30 and recovered on 2007/04/30 at 14:34:30. Further, an error log 812 is an error log of an ADF paper jam error that occurred on 2007/04/30 at 14:32:00 and recovered on 2007/04/30 at 14:35:00.

The error log information table can be generated for each error type.

Figure 9:
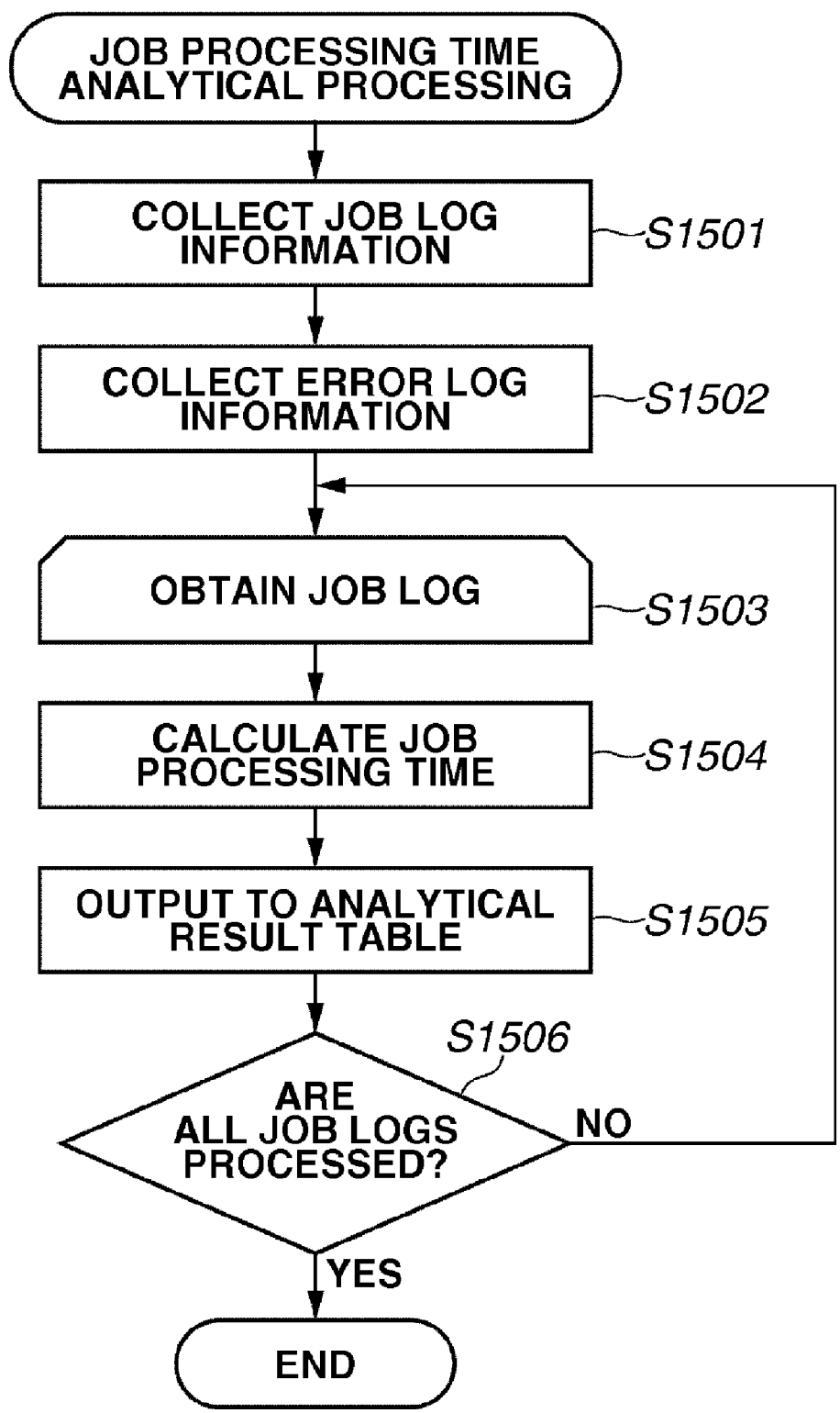
FIG. 9 is a flowchart illustrating an example of data processing procedures of the information processing apparatus according to an exemplary embodiment of the present invention.

FIG. 9 is a flowchart illustrating an example of data processing procedures of the information processing apparatus according to the present exemplary embodiment. The flowchart in FIG. 9 illustrates a case where the analytical server 104 illustrated in FIG. 1 performs analysis of the job processing time as the information processing apparatus. The analytical server 104 performs the analysis of the job processing time at regular intervals. The CPU 201 reads out a control program stored in the HD 211 or the ROM 202, loads it to the RAM 203, and executes it to realize each step in the flowchart.

When the analysis of the job processing time is started, in step S1501, the job log collecting unit 503 of the analytical server 104 communicates with the printer 101 and the multifunction peripheral 102 via the interface unit 501, and collects the job log managed by the job log management unit 608.

In step S1502, the error log collecting unit 504 of the analytical server 104 communicates with the printer 101 and the multifunction peripheral 102 via the interface unit 501, and collects the error log managed by the error log management unit 611. The acquired job log is stored in the job log collecting unit 503 in a form of a table similar to or in an expanded form of the job log information table illustrated in FIG. 7. Similarly, the acquired error log is stored in the error log collecting unit 504 in a form of a table similar to or in an expanded form of the error log information table illustrated in FIG. 8. If the log information is collected from a plurality of image forming apparatuses, an identifier of the image forming apparatuses can be added to a column of the table.

In step S1503, the analytical processing unit 502 acquires a collected job log from the job log collecting unit 503. In step S1504, the analytical processing unit 502 performs calculation of the job processing time. Details of the calculation of the job processing time performed by the analytical processing unit 502 will be described below.

In step S1505, the job processing time calculated by the analytical processing unit 502 is output to an analysis result table. In step S1506, the analytical processing unit 502 determines whether calculation of job processing time of every job log collected in step S1501 is completed. If the analytical processing unit 502 determines that the calculation of the job processing time of every job log collected in step S1501 is not completed (NO in step S1506), then the process returns to step S1503, and the process is repeated. On the other hand, if the analytical processing unit 502 determines that calculation of job processing time of every job log collected in step S1501 is completed (YES in step S1506), then the process ends.

Figure 10:
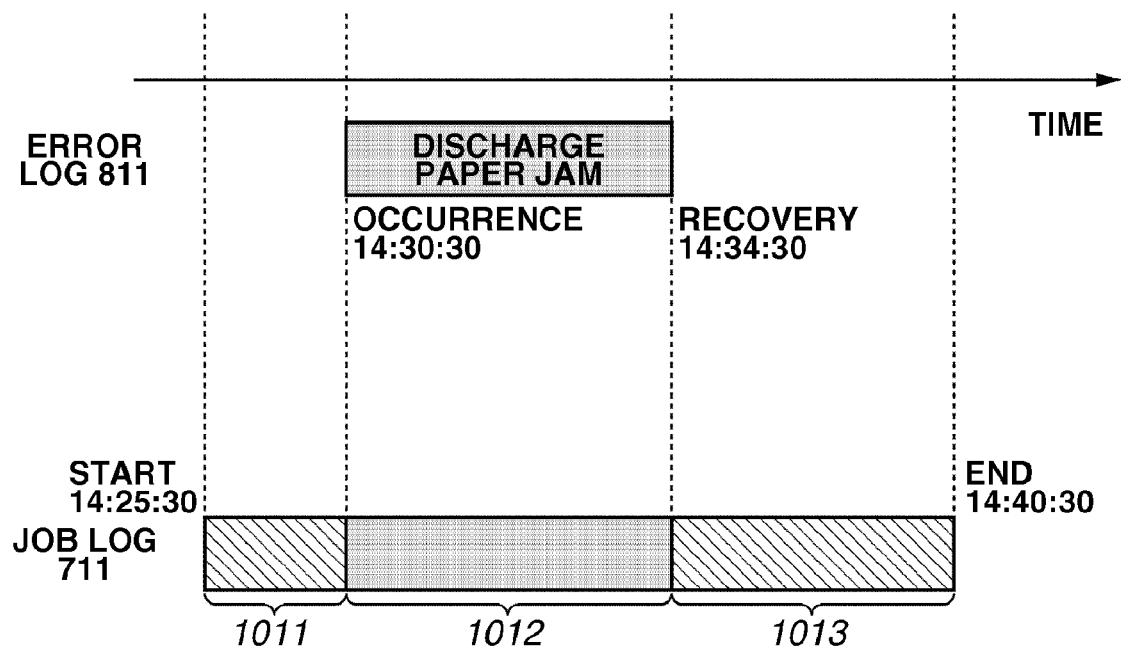
FIG. 10 illustrates aspects of calculation processing of a job processing time calculated by an analytical processing unit included in the analytical server illustrated in FIG. 1.

FIG. 10 illustrates aspects of the calculation processing of the job processing time performed by the analytical processing unit 502 of the analytical server 104 illustrated in FIG. 1. The calculation processing of the job processing time in step S1504 in FIG. 9 will now be described in detail referring to FIG. 10.

In FIG. 10, a horizontal axis is a time axis and time flows in the right direction.

The error log 811 in FIG. 10 represents the error log in the first row of the error log information table illustrated in FIG. 8. As shown, the error occurred at "14:30:30" and was recovered at "14:34:30". On the other hand, the job log 711 in FIG. 10 represents the job log in the first row of the job log information table illustrated in FIG. 7. As shown, the job started at "14:25:30" and ended at "14:40:30".

If the error that occurred in the image forming apparatus is not considered, then the job processing time can be obtained using a following formula.

processing time without considering an error= [job end time]−[job start time]

Since the print job of the job log 711 is stopped for a time period 1012 due to the discharge paper jam error of the error log 811, an actual job processing time of the image forming apparatus is a sum of a job processing time 1011 and a job processing time 1013, but excluding the time period 1012, which is from the occurrence to the recovery of the error.

If an error has occurred in the image forming apparatus between the job start time and the job end time and the processing of the job has been stopped due to the error, the job processing time is corrected.

The actual job processing time of the image forming apparatus excluding the time the processing of the job has been stopped due to the error is obtained by subtracting the time the processing of the job has been stopped due to the error from the job processing time obtained by the above formula.

Figure 11:
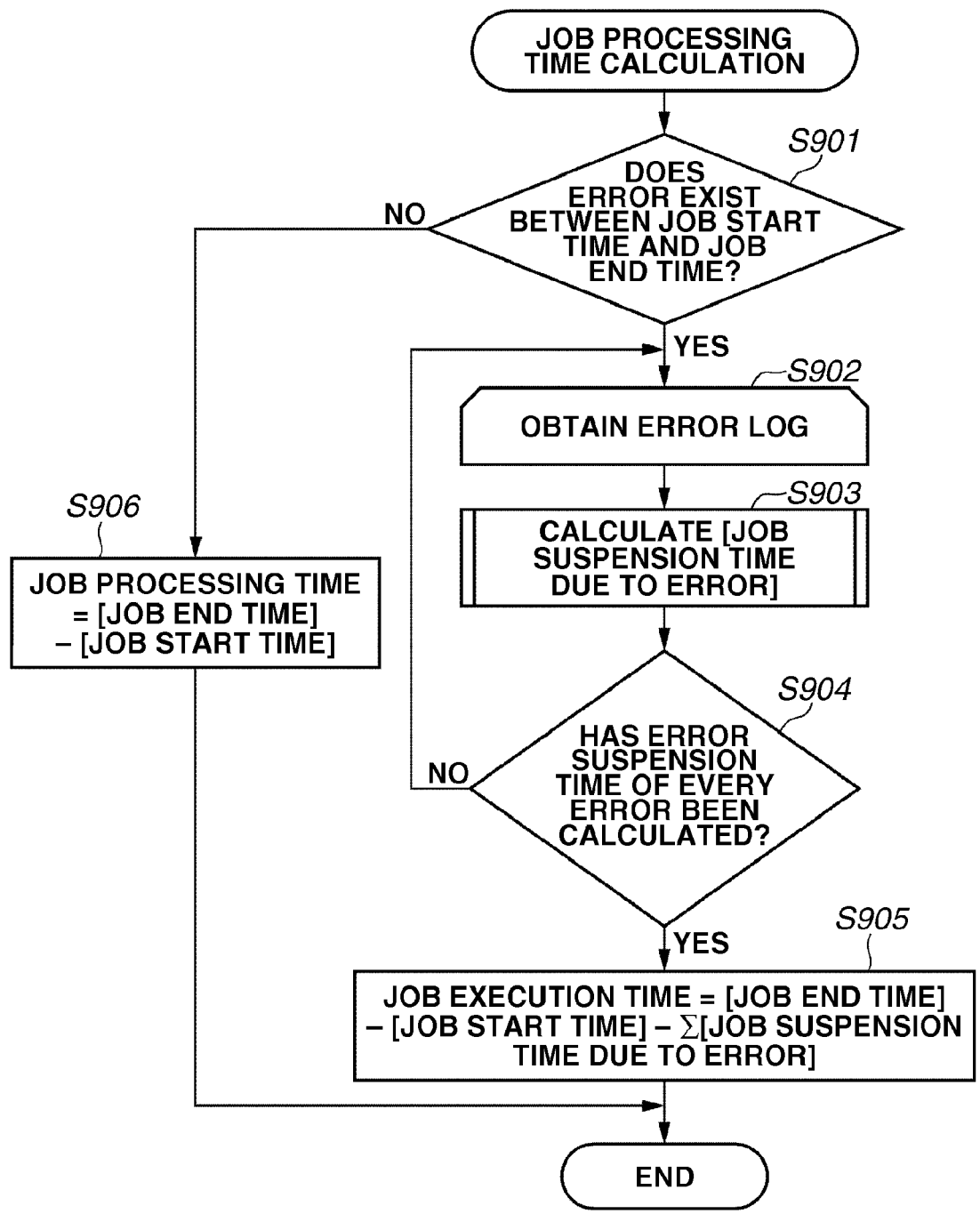
FIG. 11 is a flowchart illustrating an example of the data processing procedures of the information processing apparatus according to an exemplary embodiment of the present invention.

FIG. 11 is a flowchart illustrating an example of data processing procedures of the information processing apparatus according to the present exemplary embodiment. The flowchart in FIG. 11 illustrates an example of detailed procedures for calculating the job processing time which is executed in step S1504 of the flowchart illustrated in FIG. 9. The CPU 201 reads out the control program stored in the HD 211 or the ROM 202, loads it to the RAM 203, and executes it to realize each step in the flowchart.

When the calculation of the job processing time is started, in step S901, the analytical processing unit 502 determines whether any error has occurred between the job start time and the job end time collected by the job log collecting unit 503 referring to the error log managed by the error log collecting unit 504.

If the [error recovery time] is later than the [job start time] and the [job end time] is later than the [error occurrence time], then the analytical processing unit 502 determines that the error exists between the start time and the end time of the job.

If the analytical processing unit 502 determines that the error does not exist (NO in step S901), then the process proceeds to step S906. In step S906, the analytical processing unit 502 calculates the job processing time by the following calculating formula, and then the process ends.

job processing time=[job end time]−[job start time]

On the other hand, if the analytical processing unit 502 determines that the error exists (YES in step S901), then the process proceeds to step S902. In step S902, the analytical processing unit 502 acquires the error log from the error log collecting unit 504. Then, in step S903, the analytical processing unit 502 acquires a job suspension time due to error by calculating the time in which a time from the occurrence to the recovery of the error and a time from the job start to the job end are overlapped. Details of the calculation of the job suspension time will be described below.

In step S904, the analytical processing unit 502 determines whether calculation of the suspension time due to error is completed for every error. If the analytical processing unit 502 determines that calculation of the suspension time due to error is not completed for every error (NO in step S904), then the process returns to step S902. On the other hand, if the analytical processing unit 502 determines that calculation of the suspension time due to error is completed for every error (YES in step S904), then the process proceeds to step S905.

In step S905, the analytical processing unit 502 acquires the job execution time by the following formula. The job processing time is calculated by subtracting [job start time] from [job end time].

job execution time=[job end time]−[job start time]− $\Sigma$[job suspension time due to the error]

When the calculation of the job execution time is completed, then the process ends.

Figure 12:
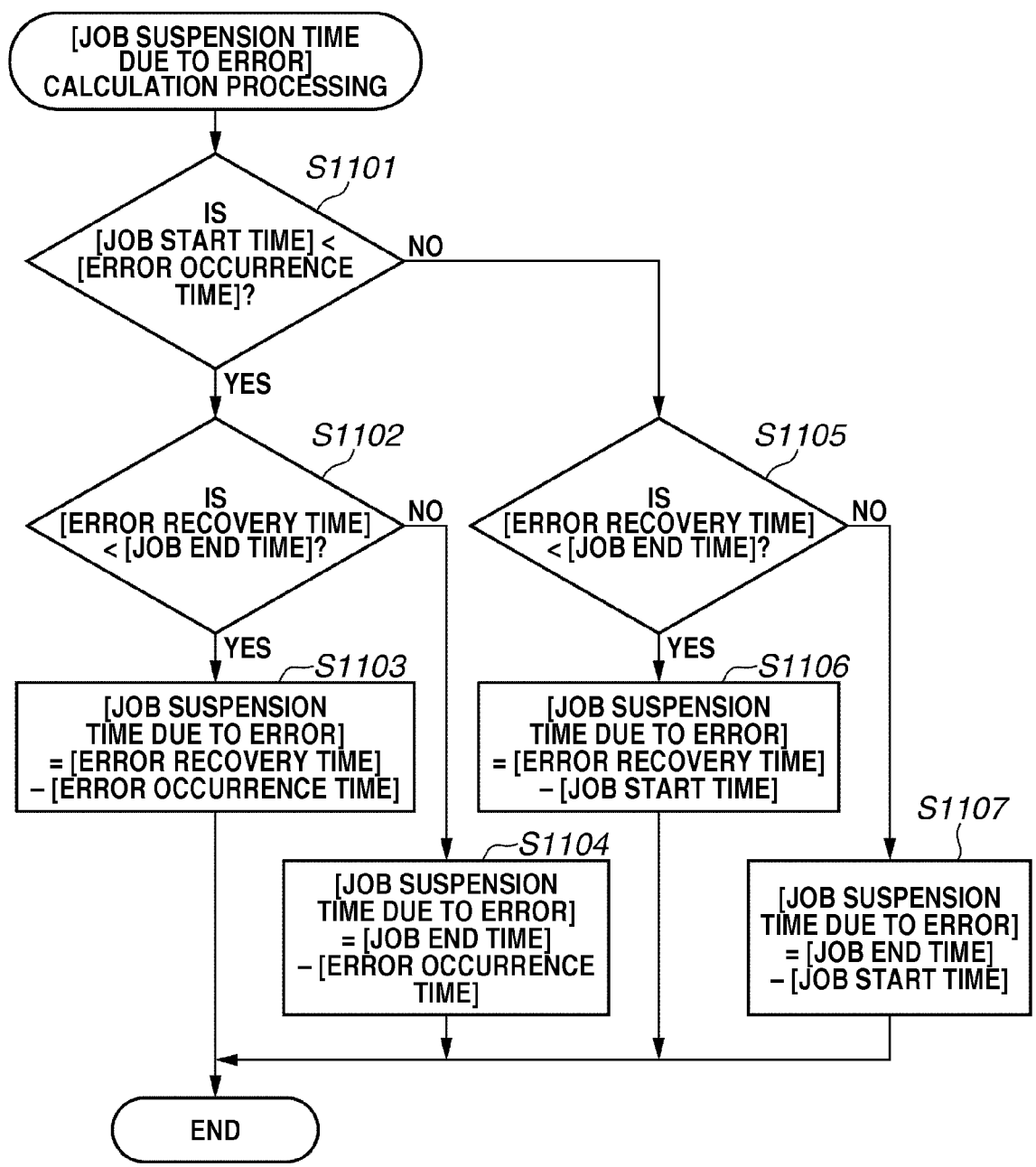
FIG. 12 is a flowchart illustrating an example of the data processing procedures of the information processing apparatus according to an exemplary embodiment of the present invention.

FIG. 12 is a flowchart illustrating an example of data processing procedures of the information processing apparatus according to the present exemplary embodiment. The flowchart in FIG. 12 illustrates an example of detailed procedures for calculating the job suspension time due to the error which is executed in step S903 of the flowchart illustrated in FIG. 11. The CPU 201 reads out the control program stored in the HD 211 or the ROM 202, loads it to the RAM 203, and executes it to realize each step in the flowchart. The analytical processing unit 502 performs the following processing by acquiring the job log from the job log collecting unit 503 or by acquiring the error log from the error log collecting unit 504.

In step S1101, the analytical processing unit 502 compares the [job start time] of the job log and the [error occurrence time] of the error log to determine whether the [job start time] of the job log is earlier than the [error occurrence time] of the error log.

If the analytical processing unit 502 determines that the [job start time] of the job log is earlier than the [error occurrence time] of the error log (YES in step S1101), then the process proceeds to step S1102. In step S1102, the analytical processing unit 502 compares the [job end time] of the job log and the [error recovery time] of the error log to determine whether the [error recovery time] of the error log is earlier than the [job end time] of the job log.

If the analytical processing unit 502 determines that the [error recovery time] of the error log is earlier than the [job end time] of the job log (YES in step S1102), then the process proceeds to step S1103.

On the other hand, if the analytical processing unit 502 determines that the [error recovery time] of the error log is not earlier than the [job end time] of the job log (NO in step S1102), then the process proceeds to step S1104.

In step S1103, the analytical processing unit 502 subtracts the [error occurrence time] of the error log from the [error recovery time] of the error log to calculate the job suspension time due to the error, and then the process ends.

On the other hand, in step S1104, the analytical processing unit 502 calculates the job suspension time due to the error by subtracting the [error occurrence time] of the error log from the [job end time] of the job log, and then the process ends.

In step S1101, if the analytical processing unit 502 determines that the [job start time] of the job log is not earlier than the [error occurrence time] of the error log (NO in step S1101), then the process proceeds to step S1105. In step S1105, the analytical processing unit 502 compares the [job end time] of the job log with the [error recovery time] of the error log to determine whether the [error recovery time] of the error log is earlier than the [job end time] of the job log. If the analytical processing unit 502 determines that the [error recovery time] of the error log is earlier than the [job end time] of the job log (YES in step S1105), then the process proceeds to step S1106.

On the other hand, if the analytical processing unit 502 determines that the [error recovery time] of the error log is not earlier than the [job end time] of the job log (NO in step S1105), then the process proceeds to step S1107.

In step S1106, the analytical processing unit 502 calculates the job suspension time due to the error by subtracting the [job start time] of the job log from the [error recovery time] of the error log, and then the process ends.

On the other hand, in step S1107, the analytical processing unit 502 calculates the job suspension time due to the error by subtracting the [job start time] of the job log from the [job end time] of the job log, and then the process ends.

Since a plurality of errors may occur while one job is being processed, the [job suspension time due to the error] is calculated for every error that occurred between the start time and the end time of the job, by loop processing from steps S902 through S904 in FIG. 11. Then, in step S905, accurate [suspension time due to error during job] is calculated by summing up the [job suspension time due to the error].

FIG. 13 illustrates a structure of an analysis result table managed by the analytical processing unit 502 illustrated in FIG. 5. The table corresponds to the analysis result table which is output in step S1505 of FIG. 9.

In FIG. 13, a job log ID 1601 corresponds to the job log ID 701 in the job log information table illustrated in FIG. 7. Records having a same job log ID are data taken from a same job log. A job processing time 1602 stores the job processing time calculated by the above-described job processing time calculation.

A record 1611 indicates the job processing time of the print job of the job log 711 illustrated in FIG. 7 and its value is "00:11:00". A record 1612 indicates the job processing time of the scan job of the job log 712 illustrated in FIG. 7 and its value is "00:01:30". A record 1613 indicates the job processing time of the copy job of the job log 713 illustrated in FIG. 7 and its value is "00:05:00".

In this way, the time the image forming apparatus processed the job can be obtained more accurately. Namely, the job processing time is corrected by excluding the time in which execution of the job is stopped due to an error that occurred in the image forming apparatus.

A calculation method for the job processing time according to the first exemplary embodiment is appropriate for an image forming apparatus such as a single function printer (SFP) in which one type of job is processed in order. However, as for an image forming apparatus such as a MFP by which a plurality types of jobs are executed in parallel, the above-described calculation method may not be optimal. Further, depending on job types or error types, processing of the job may not be stopped even when an error occurs. For example, a print job instructed from the host computer is not affected even if an ADF jam error occurs. Further, a scan job for scanning a paper document and sending the generated image data by an electronic mail, is not affected by a discharge paper jam error.

Figure 14:
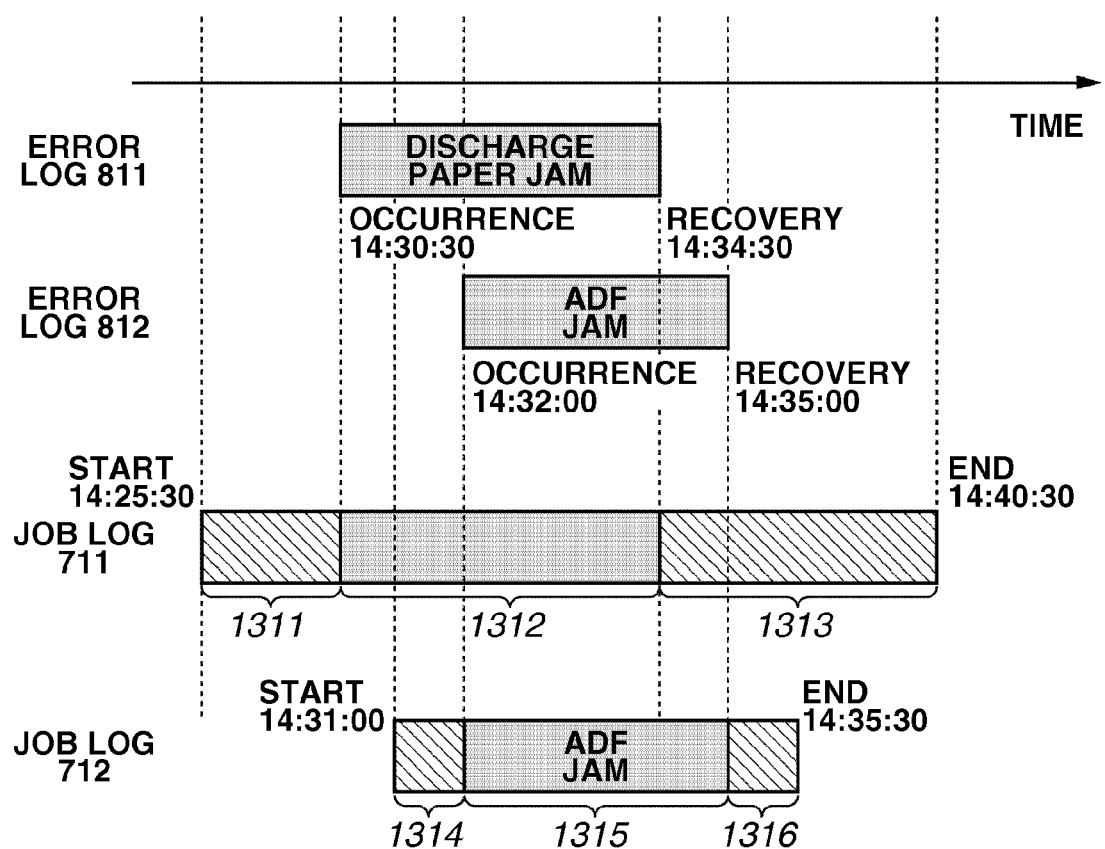
FIG. 14 illustrates aspects of calculation processing of the job processing time calculated by the analytical processing unit included in the analytical server illustrated in FIG. 1.

FIG. 14 illustrates aspects of calculation processing of the job processing time which is calculated by the analytical processing unit 502 included in the analytical server 104 illustrated in FIG. 1.

In FIG. 14, a horizontal axis is a time axis and time flows in the right direction. In FIG. 14, the error log 811 represents the discharge paper jam error log shown in the first row of the error log information table illustrated in FIG. 8. As shown, the discharge paper jam error occurred at "14:30:30" and was recovered at "14:34:30".

The error log 812 represents the ADF jam error log shown in the second row of the error log information table illustrated in FIG. 8. As shown, the ADF jam error occurred at "14:32:00" and was recovered at "14:35:00". The job log 711 represents the print job log shown in the first row of the job log information table illustrated in FIG. 7. As shown, the job started at "14:25:30" and ended at "14:40:30". The job log 712 represents the scan job log shown in the second row of the job log information table illustrated in FIG. 7. As shown, the job started at "14:31:00" and ended at "14:35:30".

Although the print job of the job log 711 is stopped for a time period 1312 due to the discharge paper jam error of the error log 811, it is not affected by the ADF paper jam of the error log 812. Thus, a sum of a job processing time 1311 and a job processing time 1313 excluding the time period 1312 is the job processing time of the job log 711.

Further, although the scan job of the job log 712 is not stopped by the discharge paper jam error of the error log 811, it is stopped by the ADF paper jam of the error log 812 for a time period 1315. Thus, a sum of a job processing time 1314 and a job processing time 1316 excluding the time period 1315 is the job processing time of the job log 712.

Job types and error types in the correction of the job processing time are considered, and only a related error from the job processing time is excluded. A calculation method for the job processing time considering a property of the MFP will be described below.

FIG. 15 illustrates an example of an error/job relation table stored in the analytical processing unit 502 included in the analytical server 104 illustrated in FIG. 1. The table is an example of job types that are affected by each error type. In other words, the job type that is affected by a certain error depends on the error type.

The error/job relation table represents a relation between an error type 1201 and a job type 1202 that is affected by the error type. A record 1211 indicates that the discharge paper jam error affects the job types such as print, copy, box print, and fax print. Similarly, a record 1212 indicates that the feed paper jam error affects the job types such as print, copy, box print, and fax print. Further, a record 1213 indicates that the ADF jam error affects the job types such as copy, scan, and send. Furthermore, a record 1214 indicates that out-of-paper error affects the job types such as print, copy, box print, and fax print.

Next, the calculation method of the job processing time using the error/job relation table illustrated in FIG. 15 will be described referring to FIG. 16.

Figure 16:
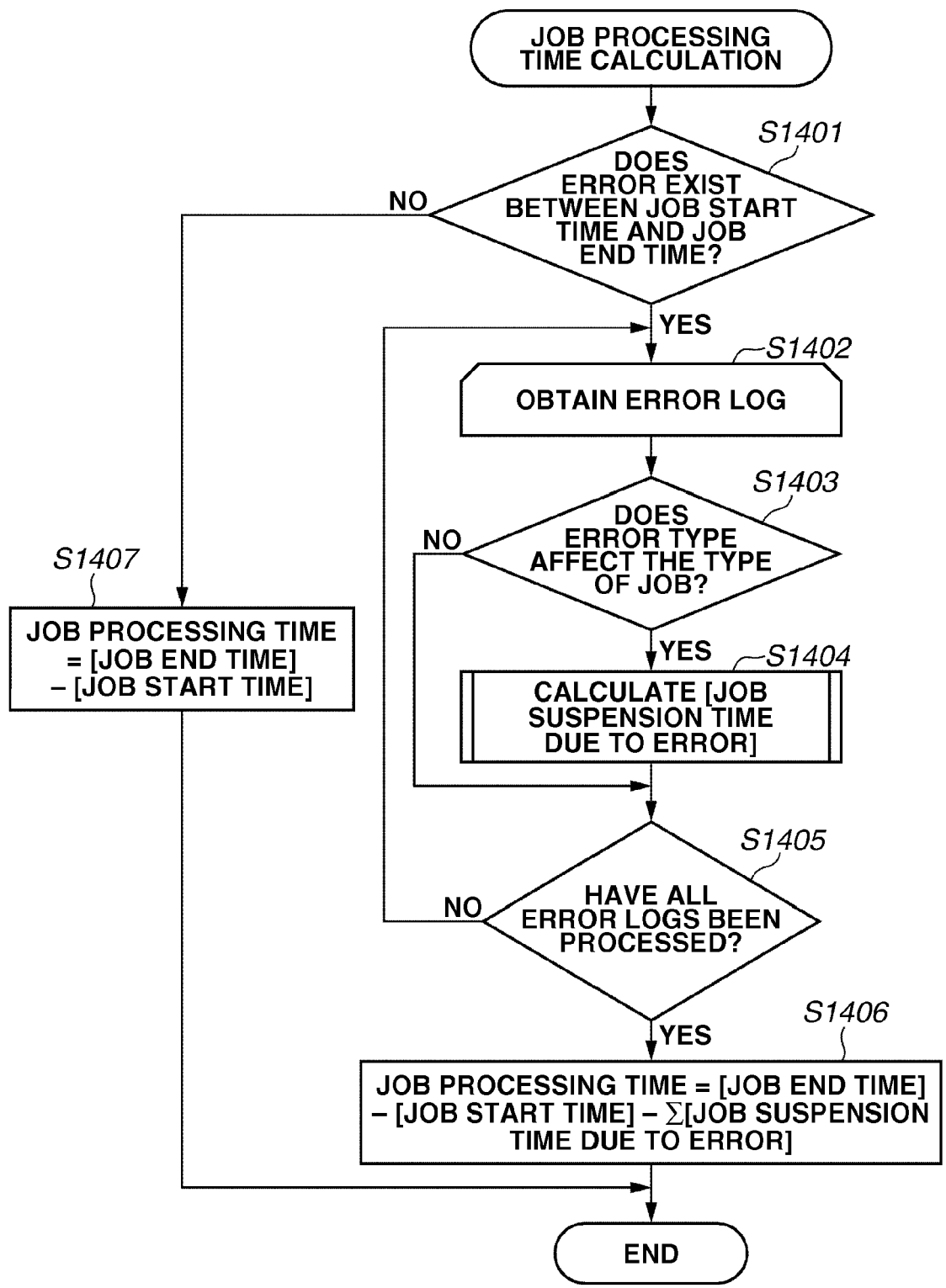
FIG. 16 is a flowchart illustrating an example of data processing procedures of the information processing apparatus according to an exemplary embodiment of the present invention.

FIG. 16 is a flowchart illustrating an example of the data processing procedures of the information processing apparatus according to a second exemplary embodiment of the present invention. The flowchart illustrates an example of detailed procedures for calculating the job processing time using the error/job relation table illustrated in FIG. 15. The CPU 201 reads out the control program stored in the HD 211 or the ROM 202, loads it to the RAM 203, and executes it to realize each step in the flowchart. The analytical processing unit 502 performs the following processing by acquiring the job log from the job log collecting unit 503 or by acquiring the error log from the error log collecting unit 504.

When the calculation of the job processing time is started, in step S1401, the analytical processing unit 502 determines whether any error has occurred between the job start time and the job end time. If the analytical processing unit 502 determines that the error does not exist (NO in step S1401), then the process proceeds to step S1407. In step S1407, the analytical processing unit 502 calculates the job processing time by the following calculating formula, and then the process ends.

job processing time=[job end time]−[job start time]

On the other hand, in step S1401, if the [error recovery time] is after the [job start time] and the [job end time] is after the [error occurrence time], the analytical processing unit 502 determines that the error has occurred between the start time and the end time of the job (YES in step S1401), and the process proceeds to step S1402. In step S1402, the analytical processing unit 502 acquires every error log from the error log collecting unit 504. Next, in step S1403, the analytical processing unit 502 determines whether the type of the error affects the type of the job by referring to the error/job relation table illustrated in FIG. 15.

The analytical processing unit 502 determines whether the type of the error affects the type of the job as follows.

First, the analytical processing unit 502 acquires the job type in the job log from the job log information table and also acquires the error type in the error log from the error log information table. Next, the analytical processing unit 502 selects the error type of the error log from columns of the error type 1201 of the error/job relation table and acquires the job types in that row and in the column of the job type 1202. Then, the analytical processing unit 502 determines whether the job type of the job log is included in the job types acquired from the job type 1202.

If the job type of the job log is included in the job types acquired from the job type 1202, the analytical processing unit 502 determines that the type of the error affects the type of the job (YES in step S1403), then the process proceeds to step S1404. In this case, since the error affects the job, the job processing time is a correction target.

If the analytical processing unit 502 determines that the type of the error does not affect the type of the job (NO in step S1403), then the process proceeds to step S1405.

In step S1404, processing similar to step S903 in FIG. 11 is performed for the error log whose job processing time is the correction target. More specifically, by calculating the time that overlaps between the occurrence time and the recovery time of the error, and the job start time and the job end time, the analytical processing unit 502 calculates the [job suspension time due to the error].

Then, in step S1405, the analytical processing unit 502 determines whether the calculation of the suspension time due to error is completed for every error log. If the analytical processing unit 502 determines that the calculation of the suspension time due to error is not completed for every error log (NO in step S1405), then the process returns to step S1402, and the calculation of the suspension time due to error is repeated. This is because the plurality of errors may occur while one job is being processed.

On the other hand, in step S1405, if the analytical processing unit 502 determines that the calculation of the suspension time due to error is completed for every error log (YES in step S1405), then the process proceeds to step S1406.

In step S1406, the analytical processing unit 502 calculates the [job suspension time due to the error] regarding the error of the correction target that has occurred in the time between the start time and the end time of the job. Then, the analytical processing unit 502 acquires the [suspension time due to error during job] according to the following formula.

[suspension time due to error during job]=
Σ[job suspension time due to the error]

Next, the analytical processing unit 502 calculates the job processing time by the following formula, and then the process ends.

job processing time=[job end time]−[job start time]−
Σ[job suspension time due to the error concerned]

The analytical server 104 obtains the job processing time of each job whose job log is in a specified period by the aforementioned calculation method, and further obtains a total job processing time by summing up the job processing time.

In this way, the time the image forming apparatus processed the job can be obtained accurately by correcting with the time the execution of the job has been stopped due to the error that occurred in the image forming apparatus and by considering the error type and the job type.

A process for calculating the operation rate that indicates a load state of the image forming apparatus and a process for presenting the operation rate to the user by using the job processing time calculated by the methods illustrated in the above-described first and the second exemplary embodiments will now be described.

An administrative computer 106 illustrated in FIG. 1 accepts a request for displaying analysis of the job processing time via keyboard and mouse operation. Then, the administrative computer 106 acquires the job processing time analysis result table and the job log information table from the analytical server 104 and displays the tables on a display.

Contents of the display may include, for example, a job type and a job processing time of each job, which may be displayed in a list form. Further, the administrative computer 106 can accept a request for displaying the operation rate of the image forming apparatus.

An analysis period of the operation rate calculation and operating time (e.g., office hours) of the image forming apparatus can be input.

When input from the user is received, the administrative computer 106 sends an acquisition request for the operation rate of the image forming apparatus to the analytical server 104. When the analytical server 104 accepts the acquisition request sent from the administrative computer 106, the analytical server 104 obtains the job processing time for each job log which is generated in a specified analysis period using the aforementioned calculation method.

Next, the analytical server 104 obtains the total job processing time which is a sum of the calculated job processing time of the jobs. Further, based on the total job processing time and the specified image forming apparatus operating time, the analytical processing unit 502 obtains an operation rate ρ of the image forming apparatus by the following calculating formula.

$$\rho = \text{total job processing time/image forming apparatus operating time}$$

The image forming apparatus operation rate for each job type may be obtained by calculating the total job processing time for each job type.

Next, the analytical server 104 returns the calculated operation rate of the image forming apparatus to the administrative computer 106. Then, the operation rate of the image forming apparatus is displayed on the display of the administrative computer 106.

According to the second exemplary embodiment, the job processing time of the job log 712 illustrated in FIG. 14 includes the job processing time 1316 which overlaps with the processing time of the job log 711. However, if the operation rate of the image forming apparatus is to be calculated with high accuracy, the job processing time 1316 is subtracted from the total job processing time of the image forming apparatus.

The job processing time 1314 which is obtained as the job processing time of the job log 712 can be included as a part of the total job processing time of the image forming apparatus.

According to the present exemplary embodiment, when the total job processing time of the image forming apparatus is obtained after the job processing time based on the job log and the error log is calculated, it is determined whether there are time periods which overlap with each other among the job processing time calculated based on a plurality of job logs.

A determination method will be described referring to the job log 712. When the job log 712 is managed, a sum of the job processing time 1314 and the job processing time 1316 is managed as the job execution time according to the above-described calculation method. Further, the start time and the end time (i.e., the occurrence time of the error log 812) of the job processing time 1314 is stored as accompanying information. Similarly, the start time (i.e., the recovery time of the error log 812) and the end time of the job processing time 1316 is stored.

The analytical processing unit 502 manages these pieces of the information together with each job log and determines whether the job processing time that overlaps among different job logs exists in a final stage of obtaining the total job processing time of the image forming apparatus. If the overlapping job processing time exists, the analytical processing unit 502 subtracts it from the total job processing time calculated based on the plurality of job logs, and an accurate total job processing time can be obtained.

By obtaining the total processing time of jobs according to the above-described processing, calculation of the operation rate of the image forming apparatus can be performed with enhanced accuracy. The present exemplary embodiment will now be described referring to the flowchart illustrated in FIG. 17.

Figure 17:
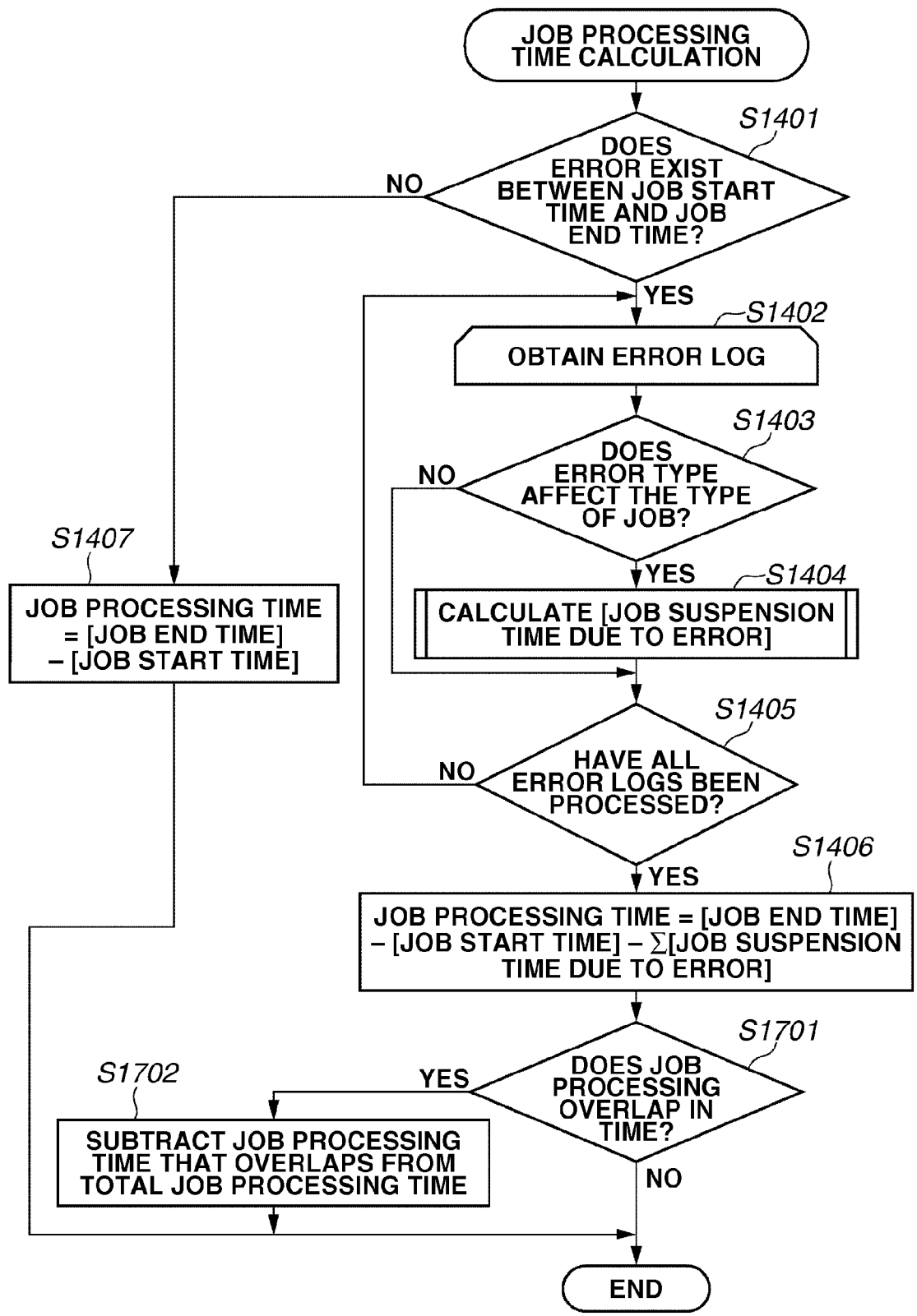
FIG. 17 is a flowchart illustrating an example of the data processing procedures of the information processing apparatus according to an exemplary embodiment of the present invention.

FIG. 17 is a flowchart illustrating an example of a data processing procedures of the information processing apparatus according to the present exemplary embodiment. The present exemplary embodiment is an example of detailed procedures for calculating an accurate job processing time by using the error/job relation table illustrated in FIG. 15, and determining whether each job processing time overlaps with each other. The CPU 201 reads out the control program stored in the HD 211 or the ROM 202, loads it to the RAM 203, and executes it to realize each step in the flowchart. The analytical processing unit 502 performs the following processing by acquiring the job log from the job log collecting unit 503 or by acquiring the error log from the error log collecting unit 504.

Since steps S1401 through S1407 are described above with respect to FIG. 16, redundant description thereof will be avoided.

When the process in step S1406 is completed, in step S1701, the analytical processing unit 502 determines whether there is overlapping in the job processing time period of each job that has been calculated. More specifically, the analytical processing unit 502 determines whether the job processing time 1313 overlaps with a job processing time 1316 illustrated in FIG. 14. If the analytical processing unit 502 determines that there is no overlapping (NO in step S1701), then the process ends.

On the other hand, if the analytical processing unit 502 determines that there is the overlapping (YES in step S1701), then in step S1702, the analytical processing unit 502 subtracts the job processing time that overlaps from the sum of the job processing time calculated in step S1406, and determines the result as the job processing time, and then the process ends. In this way, the job processing time of the jobs that overlaps can be subtracted from the sum of the job processing time calculated in step S1406.

Thus, by using the subtracted job processing time, even if image forming processing including job processing that overlaps is executed, the operation rate of the image forming apparatus can be accurately calculated.

Referring to a memory map illustrated in FIG. 18, a configuration of a data processing program which can be read out by the information processing apparatus according to the exemplary embodiments of the present invention will be described.

FIG. 18 is the memory map of a storage medium which stores various types of data processing programs which can be read out by the information processing apparatus according to the exemplary embodiments of the present invention.

Although not illustrated, information for managing a program group stored in a storage medium, for example, version information and author information are stored in the storage medium. Furthermore, information which depends on an OS on a program readout side, for example, an icon or the like for identifying a program, can be stored in the storage medium.

Data which is dependent on the various types of programs is stored in the directory. Further, programs for installing the various types of programs in a computer and a decompression program which is used when a program to be installed is compressed are stored.

Functions described in the flowchart illustrated in FIGS. 9, 11, 12, and 16 according to the exemplary embodiments can be realized by a host computer using a program installed from an outside device. In this case, the present invention can be applied when an information group including the program is provided to an output apparatus from a storage medium such as a compact disc read-only memory (CD-ROM), a flash memory, and a floppy disk (FD), or an outside storage medium via a network.

As described above, a storage medium storing a software program code which realizes a function of the above-described exemplary embodiments can be supplied to a system or an apparatus. The present invention can be achieved when a computer (or a CPU or a micro processing unit (MPU)) of the system or the apparatus reads and executes the program code stored in the storage medium.

In this case, the program code read out from the storage medium realizes the functions described in the exemplary embodiments of the present invention. Thus, the storage medium which stores the program code constitutes an embodiment of the present invention.

Accordingly, the computer-executable program can be provided in a form of an object code, a program executed by an interpreter, or script data supplied to an OS, etc., if it functions as a program.

A storage medium for supplying the program includes, for example, a floppy disk, a hard disk, an optical disk, a magneto-optical disc (MO), a CD-ROM, a compact disc recordable (CD-R), a compact disc rewritable (CD-RW), a magnetic tape, a non-volatile memory card, a ROM, and a digital versatile disc (DVD).

In this case, the program code read out from the storage medium realizes the functions of the above-described exemplary embodiments, and the storage medium which stores the program code constitutes an embodiment of the present invention.

The program can be supplied to a user by connecting to an Internet website using a browser of a client computer and downloading the computer-executable program of the present invention or a compressed file including an automated installation function into a recording medium, such as a hard disk. Further, the program code that configures the program of the exemplary embodiments of the present invention can be divided into a plurality of files and each file can be downloaded from different Internet websites. For example, a World Wide Web (WWW) server or a file transfer protocol (ftp) server which allows a plurality of users to download a program file to realize the functions of the exemplary embodiments of the present invention also implements an embodiment of the present invention.

Furthermore, the program of the present invention can be encrypted, recorded on a storage medium, such as a CD-ROM, and delivered to users. In this case, a user who satisfies a predetermined condition is allowed to download decryption key information from an Internet website via the Internet. Then the user can decrypt the encrypted program using the decryption key information, and install the decrypted program on the computer to realize the functions of the exemplary embodiments of the present invention.

The functions of the above-described exemplary embodiments may be implemented when the provided program code is executed by a computer. In addition to this, for example, an OS running on a computer can realize the functions of the above-described exemplary embodiments by performing the entire or a part of the actual processing based on an instruction from the program code.

Furthermore, the program code read out from the recording medium may be written in a memory in a function expansion board inserted in a computer or a function expansion unit connected to the computer, and a CPU provided in the function expansion board or the function expansion unit may perform all or a part of the actual processing based on an instruction from the program to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-051838 filed Mar. 3, 2008, which is hereby incorporated by reference herein in its entirety.

What is claimed is:

1. An information processing apparatus configured to calculate an operation rate of an image forming apparatus by using a specified period in which the image forming apparatus is operating and a sum of job execution times of a plurality of jobs executed in the specified period, the information processing apparatus comprising:

an acquisition unit configured to acquire job log information and error log information from the image forming apparatus;

an identification unit configured to identify a job processing time from a job start time and a job end time of each job recorded in the job log information which is acquired by the acquisition unit and identify a job suspension time of each job from an occurrence time and a recovery time of an error of each log recorded in the error log information;

a calculation unit configured to calculate the job execution time based on the job processing time and the job suspension time which are identified by the identification unit; and a summing unit configured to sum up the job execution times calculated by the calculation unit, wherein the information processing apparatus can simultaneously execute the plurality of jobs, and wherein when a plurality of jobs whose periods from a job start time to a job end time recorded in the job log information are overlapping are detected, the summing unit refers to the job start times and the job end times in the job log information corresponding to the plurality of jobs, and an occurrence time and a recovery time of an error that occur during execution of the plurality of jobs which are detected based on the error log information and, when the plurality of jobs are executed in an overlapping manner, the summing unit calculates the operation rate of the image forming apparatus by using a time which is calculated by subtracting the overlapping job execution time from the sum of the job execution times of the plurality of jobs summed up by the summing unit and using the specified period in which the image forming apparatus is operating.

2. The information processing apparatus according to claim 1, wherein when occurrence of the error in the image forming apparatus is detected in the job processing time of the job which is identified by the identification unit based on the error log information, the calculation unit calculates the job execution time by subtracting the job suspension time due to the error which is identified by the identification unit from the job processing time.

3. The information processing apparatus according to claim 1, wherein when occurrence of the error in the image forming apparatus is detected in the job processing time of the job which is identified by the identification unit based on the error log information, if a type of the error does not affect execution of the job, the calculation unit calculates the job processing time of the job as the job execution time without subtracting the job suspension time which is identified by the identification unit from the job processing time.

4. A method for processing a job in an information processing apparatus configured to calculate an operation rate of an image forming apparatus by using a specified period in which the image forming apparatus is operating and a sum of job execution times of a plurality of jobs which is executed in the specified period, the method comprising:

acquiring job log information and error log information from the image forming apparatus;

identifying a job processing time from a job start time and a job end time of each job recorded in the acquired job log information and identifying a job suspension time of each job from an occurrence time and a recovery time of an error of each log recorded in the error log information;

calculating the job execution time based on the identified job processing time and the job suspension time; and summing up the calculated job execution times, wherein the information processing apparatus can simultaneously execute the plurality of jobs, and wherein when a plurality of jobs whose periods from the job start time to the job end time recorded in the job log information are overlapping are detected, referring to the job start time and the job end time in the job log information corresponding to the plurality of jobs, and an occurrence time and a recovery time of an error that occur during execution of the plurality of jobs and are detected based on the error log information and, when the plurality of jobs are executed in an overlapping manner, calculating the operation rate of the image forming apparatus by using a time which is calculated by subtracting the overlapping job execution time from the sum of the obtained job execution time of the plurality of jobs and using the specified period in which the image forming apparatus is operating.

5. The method for processing the job according to claim 4, further comprising, when occurrence of the error in the image forming apparatus is detected in the identified job processing time based on the error log information, calculating the job execution time by subtracting the identified job suspension time due to the error from the job processing time.

6. The method for processing the job according to claim 4, further comprising, when occurrence of the error in the image forming apparatus is detected in the identified job processing time based on the error log information, calculating the job processing time of the job as the job execution time without subtracting the identified job suspension time from the job processing time if a type of the error does not affect execution of the job.

7. A computer-readable storage medium storing a program for causing a computer to execute a method for processing a job in an information processing apparatus configured to calculate an operation rate of an image forming apparatus by using a specified period in which the image forming apparatus is operating and a sum of job execution times of a plurality of jobs executed in the specified period, wherein the method for processing the job comprising:

acquiring job log information and error log information from the image forming apparatus;

identifying a job processing time from a job start time and a job end time of each job recorded in the acquired job log information and identifying a job suspension time of each job from an occurrence time and a recovery time of an error of each log recorded in the error log information;

calculating the job execution time based on the identified job processing time and the job suspension time; and summing up the calculated job execution times, wherein the information processing apparatus can simultaneously execute the plurality of jobs, and wherein when a plurality of jobs whose periods from the job start time to the job end time recorded in the job log information are overlapping are detected, referring to the job start time and the job end time in the job log information corresponding to the plurality of jobs, and an occurrence time and a recovery time of an error that occur during execution of the plurality of jobs and are detected based on the error log information and, when the plurality of jobs are executed in an overlapping manner, calculating the operation rate of the image forming apparatus by using a time which is calculated by subtracting the overlapping job execution time from the sum of the obtained job execution time of the plurality of jobs and using the specified period in which the image forming apparatus is operating.

* * * * *